United States Patent
Tsai et al.

(10) Patent No.: US 12,533,023 B2
(45) Date of Patent: Jan. 27, 2026

(54) OPTICAL BIOMETER

(71) Applicant: Crystalvue Medical Corporation, Taoyuan (TW)

(72) Inventors: Che-Liang Tsai, Taoyuan (TW); William Wang, Taoyuan (TW); Chung-Ping Chuang, Taoyuan (TW); Sung-Yang Wei, Taoyuan (TW); Hsuan-Hao Chao, Taoyuan (TW); Chung-Cheng Chou, Taoyuan (TW)

(73) Assignee: Crystalvue Medical Corporation, Taoyuan (TW)

(*) Notice: Subject to any disclaimer, the term of this patent is extended or adjusted under 35 U.S.C. 154(b) by 417 days.

(21) Appl. No.: 18/221,614

(22) Filed: Jul. 13, 2023

(65) Prior Publication Data
US 2024/0023807 A1   Jan. 25, 2024

Related U.S. Application Data

(60) Provisional application No. 63/391,153, filed on Jul. 21, 2022.

(51) Int. Cl.
*A61B 3/12* (2006.01)
*A61B 3/107* (2006.01)

(52) U.S. Cl.
CPC .............. *A61B 3/12* (2013.01); *A61B 3/107* (2013.01)

(58) Field of Classification Search
None
See application file for complete search history.

(56) References Cited

U.S. PATENT DOCUMENTS

| | | | | |
|---|---|---|---|---|
| 5,141,302 | A | * | 8/1992 | Arai ............... A61B 3/1005 351/205 |
| 2011/0199579 | A1 | * | 8/2011 | Muto .............. A61B 3/15 351/208 |
| 2013/0235343 | A1 | * | 9/2013 | Hee ............... A61B 3/102 351/206 |
| 2019/0282083 | A1 | * | 9/2019 | Hayashi ........... A61B 3/12 |
| 2021/0298599 | A1 | * | 9/2021 | Takii .............. A61B 3/18 |

* cited by examiner

*Primary Examiner* — Sharrief I Broome
*Assistant Examiner* — Journey F Sumlar
(74) *Attorney, Agent, or Firm* — Patterson + Sheridan, LLP

(57) ABSTRACT

An optical biometer including a light source, a first-stage coupler, a first and a second second-stage coupler, a first and a second optical path difference generator, a first and a second optical component set, a first and a second detection device is disclosed. The first-stage coupler receives an incident light from the light source and emits first and second first-stage lights. The first second-stage coupler receives the first first-stage light and emits first and second second-stage lights. The second second-stage coupler receives the second first-stage light and emits third and fourth second-stage lights. The first/second optical path difference generator generates the first/fourth second-stage light with the first/second optical path difference. The first/second optical component set emits the second/third second-stage light to a first/second position of an eye and receives a first/second reflected light. The first/second detector receives a first/second detection light.

13 Claims, 17 Drawing Sheets

OPTICAL BIOMETER

CROSS REFERENCE TO RELATED APPLICATIONS

This Application is a non-provisional application claiming priority to U.S. Provisional Application 62/391,153 filed on Jul. 21, 2022, which is incorporated by reference in its entirety.

BACKGROUND OF THE INVENTION

Field of the Invention

The invention relates to biometrics; in particular, to an optical biometer.

Description of the Prior Art

As shown in FIG. 1, when a conventional optical biometer 1 is applied to detect an eye EYE, its optical sensing module SEN needs to measure different positions/interfaces (such as a cornea, front of crystalline lens, back of crystalline lens and a retina) of the eye EYE. It takes a long time for the eye EYE with a long eye axis, resulting in a longer overall detection time and fail to realize a function of synchronously detecting different positions/interfaces of the eye EYE, which needs to be further improved.

SUMMARY OF THE INVENTION

Therefore, the invention provides an optical biometer to solve the above-mentioned problems of the prior arts.

A preferred embodiment of the invention is an optical biometer. In this embodiment, the optical biometer includes a light source, a first-stage coupler, a first second-stage coupler, a second second-stage coupler, a first optical path difference generator, a second optical path difference generator, a first optical component set, a second optical component set, a first detector and a second detector. The light source is configured to emit an incident light. The first-stage coupler is configured to receive the incident light and emit a first first-stage light and a second first-stage light respectively. The first second-stage coupler is configured to receive the first first-stage light and emit a first second-stage light and a second second-stage light respectively. The second second-stage coupler is configured to receive the second first-stage light and emit a third second-stage light and a fourth second-stage light respectively. The first optical path difference generator is configured to receive the first second-stage light and emit the first second-stage light with a first optical path difference to the first second-stage coupler. The second optical path difference generator is configured to receive the fourth second-stage light and emit the fourth second-stage light with a second optical path difference to the second second-stage coupler. The first optical component set is configured to emit the second second-stage light to a first position/interface of an eye and emit a first reflected light reflected from the first position/interface to the first second-stage coupler. The second optical component set is configured to emit the third second-stage light to a second position/interface of the eye and emit a second reflected light reflected from the second position/interface to the second second-stage coupler. The first detector is configured to receive a first detection signal generated by the first second-stage coupler according to the first second-stage light with the first optical path difference and the first reflected light. The second detector is configured to receive a second detection signal generated by the second second-stage coupler according to the fourth second-stage light with the second optical path difference and the second reflected light.

In an embodiment, the first position/interface is a retina and the first detection signal is related to the retina.

In an embodiment, the second position/interface is a cornea and the second detection signal is related to the cornea.

In an embodiment, the first optical path difference generator includes a first lens and a first reflector, and the first second-stage light emitted by the first second-stage coupler passes through the first lens to the first reflector and is then reflected by the first reflector to pass through the first lens to the first second-stage coupler, and the first reflector moves horizontally, so that the first optical path difference is generated in the first second-stage light.

In an embodiment, the second optical path difference generator includes a second lens and a second reflector, and the fourth second-stage light emitted by the second second-stage coupler passes through the second lens to the second reflector and is then reflected by the second reflector to pass through the second lens to the second second-stage coupler, and the second reflector moves horizontally, so that the second optical path difference is generated in the fourth second-stage light.

In an embodiment, the first optical path difference generator includes a first rotator and a first reflector, and the first second-stage light emitted by the first second-stage coupler passes through the first rotator to the first reflector and is then reflected by the first reflector to pass through the first rotator to the first second-stage coupler, and the first rotator rotates, so that the first optical path difference is generated in the first second-stage light.

In an embodiment, the second optical path difference generator includes a second rotator and a second reflector, and the fourth second-stage light emitted by the second second-stage coupler passes through the second rotator to the second reflector and is then reflected by the second reflector to pass through the second rotator to the second second-stage coupler, and the second rotator rotates, so that the second optical path difference is generated in the fourth second-stage light.

In an embodiment, after a first rotation speed of the first rotator and a second rotation speed of the second rotator are adjusted, a signal difference between the first detection signal received by the first detector and the second detection signal received by the second detector is largest, so that a balanced detection of the first detection signal and the second detection signal is realized.

In an embodiment, after a first rotation speed of the first rotator and a second rotation speed of the second rotator are adjusted, the first rotation speed is larger than the second rotation speed, so that the first detection signal received by the first detector has larger data volume than the second detection signal received by the second detector.

In an embodiment, the first optical path difference generator further includes a first medium that can be moved in/out, the first medium is selectively moved into between the first rotator and the first reflector or moved out of the first optical path difference generator, so that the first optical path difference is generated in the first first-stage light emitted to the first optical path difference generator; the second optical path difference generator further includes a second medium that can be moved in/out, the second medium is selectively moved into between the second rotator and the second reflector or moved out of the second optical path difference generator, so that the second optical path difference is generated in the second first-stage light emitted to the second optical path difference generator.

In an embodiment, the optical biometer further includes an optical switch, disposed between the second second-stage coupler and the second optical component set, configured to control the second optical component set to be turned on or off.

In an embodiment, the optical biometer also comprises a Galvo mirror or a motor, scanning times of the first optical component set and the second optical component set are synchronized or partially overlapped with each other and the Galvo mirror or the motor is moved during a non-scanning time to scan different positions/interfaces of the eye.

In an embodiment, the optical biometer further includes a polarization beam splitter, disposed among the first optical component set, the second optical component set and the eye; a first polarizer, disposed between the first optical component set and the polarization beam splitter, configured to polarize the second second-stage light and then transmit the polarized second second-stage light to the eye through the polarization beam splitter; and a second polarizer, disposed between the second optical component set and the polarization beam splitter, configured to polarize the third second-stage light and then transmit the polarized third second-stage light to the eye through the polarization beam splitter.

Compared to the prior art, the optical biometer proposed by the invention can not only measure different positions/interfaces of the eye synchronously to save time, but also reduce the error caused by human eye/machine shaking, reduce the loss of measurement signals, and move the position to quickly scan the eye axial length/eye shape and the optical coherence tomography (OCT) signal and other functions.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

Figure 1:
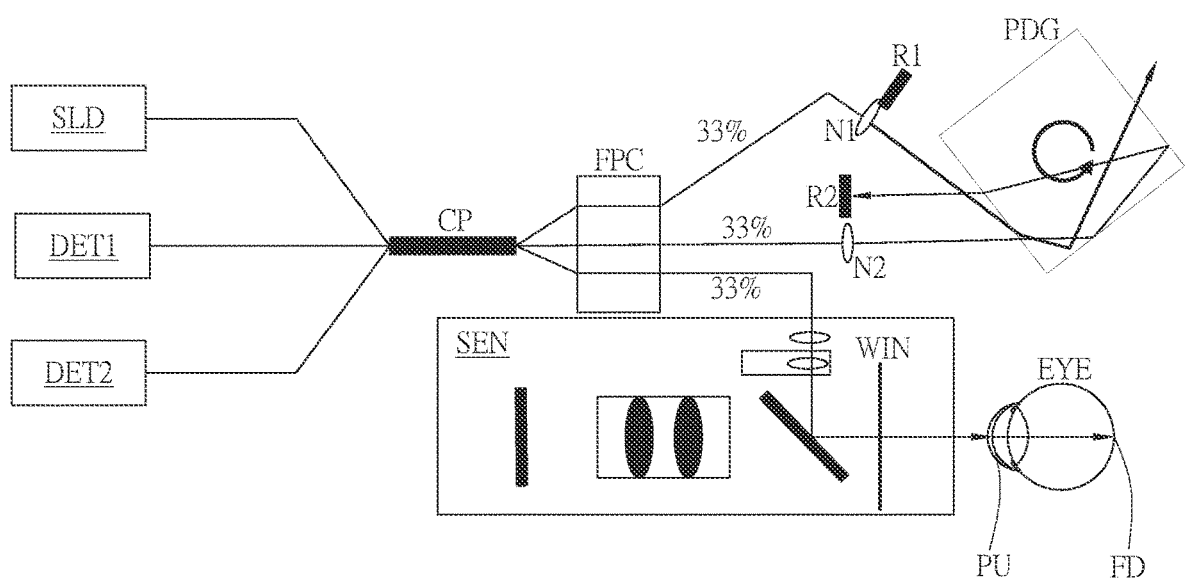
FIG. 1 illustrates a schematic diagram of an optical biometer of the prior art.

Reference will now be made in detail to the exemplary embodiments of the invention, examples of which are illustrated in the accompanying drawings. Elements/members with the same or similar numbers used in the drawings and embodiments are used to represent the same or similar parts.

Figure 2:
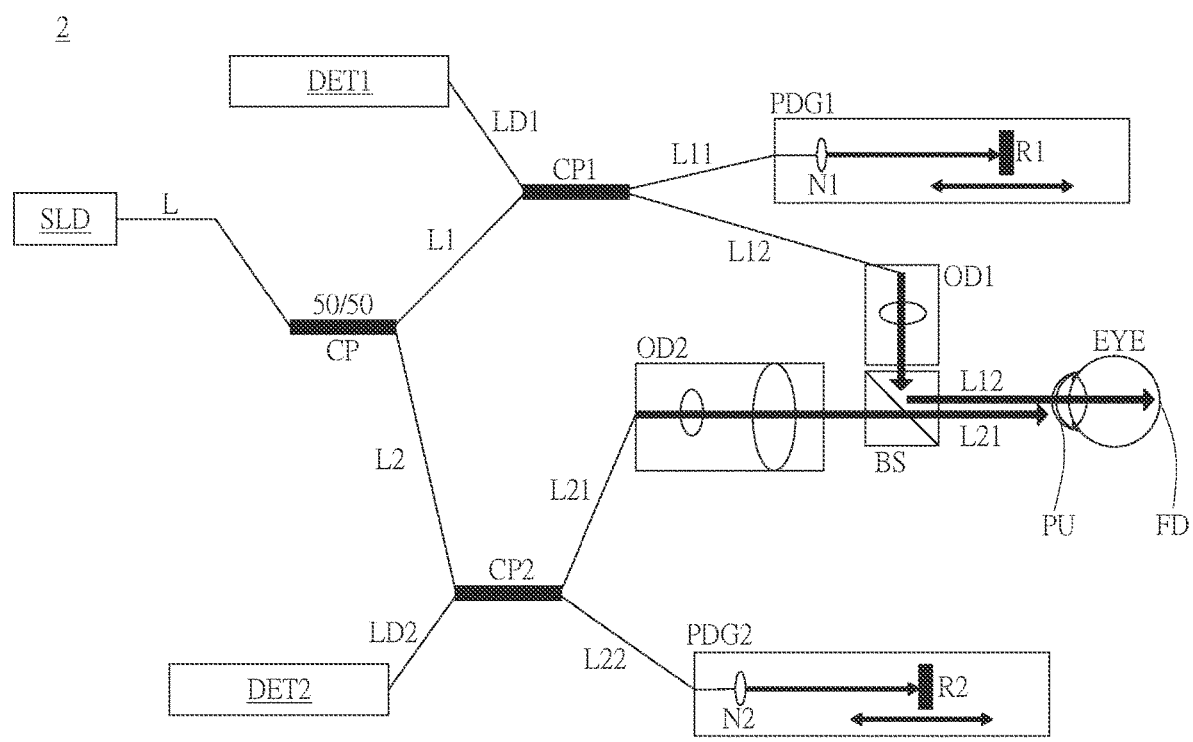
FIG. 2 illustrates a schematic diagram of an optical biometer in a preferred embodiment of the invention.

A specific embodiment of the invention is an optical biometer. In this embodiment, the optical biometer is configured to detect and measure the eyes, but not limited to this. Please refer to FIG. 2. FIG. 2 illustrates a schematic diagram of the optical biometer of this embodiment.

As shown in FIG. 2, the optical biometer 2 includes a light source SLD, a first-stage coupler CP, a first second-stage coupler CP1, a second second-stage coupler CP2, a first optical path difference generator PDG1, a second optical path difference generator PDG2, a first optical component set OD1, a second optical component set OD2, a beam splitter BS, a first detector DET1 and a second detector DET2.

The light source SLD is configured to emit an incident light L. The first-stage coupler CP is configured to receive the incident light L and emit a first first-stage light L1 and a second first-stage light L2 respectively. The first second-stage coupler CP1 is configured to receive the first first-stage light L1 and emit a first second-stage light L11 and a second second-stage light L12 respectively. The second second-stage coupler CP2 is configured to receive the second first-stage light L2 and emit a third second-stage light L21 and a fourth second-stage light L22 respectively.

The first optical path difference generator PDG1 is configured to receive the first second-stage light L11 and emit the first second-stage light L11 with a first optical path difference to the first second-stage coupler CP1. In this embodiment, the first optical path difference generator PDG1 includes a first lens N1 and a first reflector R1. The first second-stage light L11 emitted by the first second-stage coupler CP1 passes through the first lens N1 to the first reflector R1 and is then reflected by the first reflector R1 to pass through the first lens N1 to the first second-stage coupler CP1. It should be noted that the first reflector R1 moves in a horizontal direction, so that the time when the first reflector R1 reflects the first second-stage light L11 changes, and a first optical path difference can be generated in the first second-stage light L11.

The second optical path difference generator PDG2 is configured to receive the fourth second-stage light L22 and emit the fourth second-stage light L22 with a second optical path difference to the second second-stage coupler CP2. In this embodiment, the second optical path difference generator PDG2 includes a second lens N2 and a second reflector R2. The fourth second-stage light L22 emitted by the second second-stage coupler CP2 passes through the second lens N2 to the second reflector R2, and is then reflected by the second reflector R2 and passes through the second lens N2 to the second second-stage coupler CP2. It should be noted that the second reflector R2 moves in the horizontal direction, so that the time when the second reflector R2 reflects the fourth second-stage light L22 changes, and a second optical path difference can be generated in the fourth second-stage light L22.

The first optical component set OD1 is configured to emit the second second-stage light L12 to a first position/interface FD of the eye EYE through the beam splitter BS and receive a first reflected light LR1 reflected by the first position/interface FD through the beam splitter BS and then emit it to the first second-stage coupler CP1. The second optical component set OD2 is configured to emit the third second-stage light L21 to a second position/interface PU of the eye EYE through the beam splitter BS and receive a second reflected light LR2 reflected by the second position/interface PU through the beam splitter BS and then emit it to the second second-stage coupler CP2.

It should be noted that since the optical biometer 2 is provided with two optical component sets (the first optical component set OD1 and the second optical component set OD); for example, the first optical component set OD1 can be configured to measure the interface near the cornea and the second optical component set OD2 can be configured to measure the interface near the retina. Since both the first optical component set OD1 and the second optical component set OD2 do not need to scan a long distance, the measurement time can be effectively reduced.

The first detector DET1 is configured to receive a first detection signal LD1 generated by the first second-stage coupler CP1 according to the first second-stage light L11 with the first optical path difference and the first reflected light LR1. The second detector DET2 is configured to receive a second detection signal LD2 generated by the second-stage coupler CP2 according to the fourth second-stage light L22 with the second optical path difference and the second reflected light LR2. In this embodiment, the first position/interface FD is the retina and the first detection signal LD1 is related to the retina; the second position/interface PU is the cornea and the second detection signal LD2 is related to the cornea.

Figure 3:
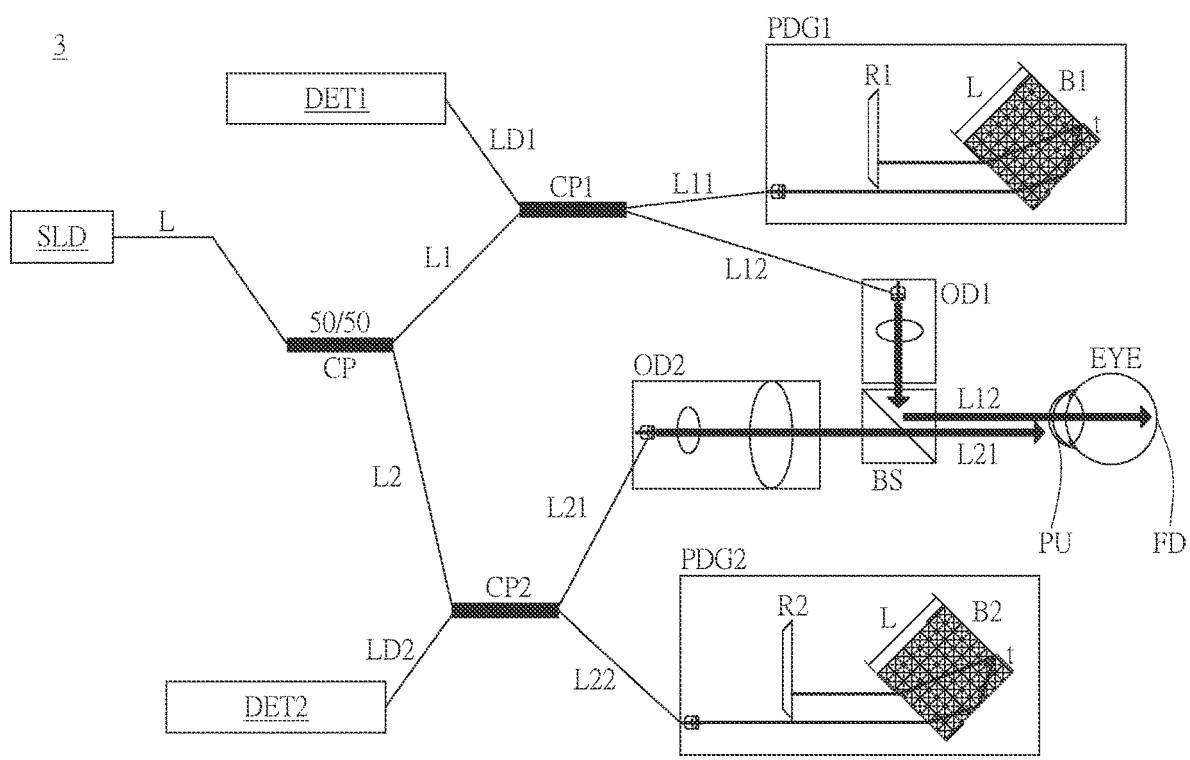
FIG. 3 illustrates a schematic diagram of an optical biometer in another preferred embodiment of the invention.

In another embodiment, please refer to FIG. 3. FIG. 3 illustrates a schematic diagram of the optical biometer of this embodiment. As shown in FIG. 3, the optical biometer 3 includes a light source SLD, a first-stage coupler CP, a first second-stage coupler CP1, a second second-stage coupler CP2, a first optical path difference generator PDG1, a second optical path difference generator PDG2, a first optical component set OD1, a second optical component set OD2, a beam splitter BS, a first detector DET1 and a second detector DET2.

It should be noted that the optical biometer 3 of FIG. 3 is different from the optical biometer 2 of FIG. 2 in that: the first optical path difference generator PDG1 of the optical biometer 3 of FIG. 3 includes a first rotator B1 and a first reflector R1. The first second-stage light L11 emitted by the first second-stage coupler CP1 passes through the first rotator B1 to the first reflector R1, and is then reflected by the first reflector R1 and passes through the first rotator B1 to the first second-stage coupler CP1. The first rotator B1 rotates, so that a first optical path difference is generated in the first second-stage light L11.

Similarly, the second optical path difference generator PDG2 of the optical biometer 3 in FIG. 3 includes a second rotator B2 and a second reflector R2. The fourth second-stage light L22 emitted by the second second-stage coupler CP2 passes through the second rotator B2 to the second reflector R2 and is then reflected by the second reflector R2 and passes through the second rotator B2 to the second second-stage coupler CP2. The second rotator B2 rotates, so that a second optical path difference is generated in the fourth second-stage light L22.

Figure 4:
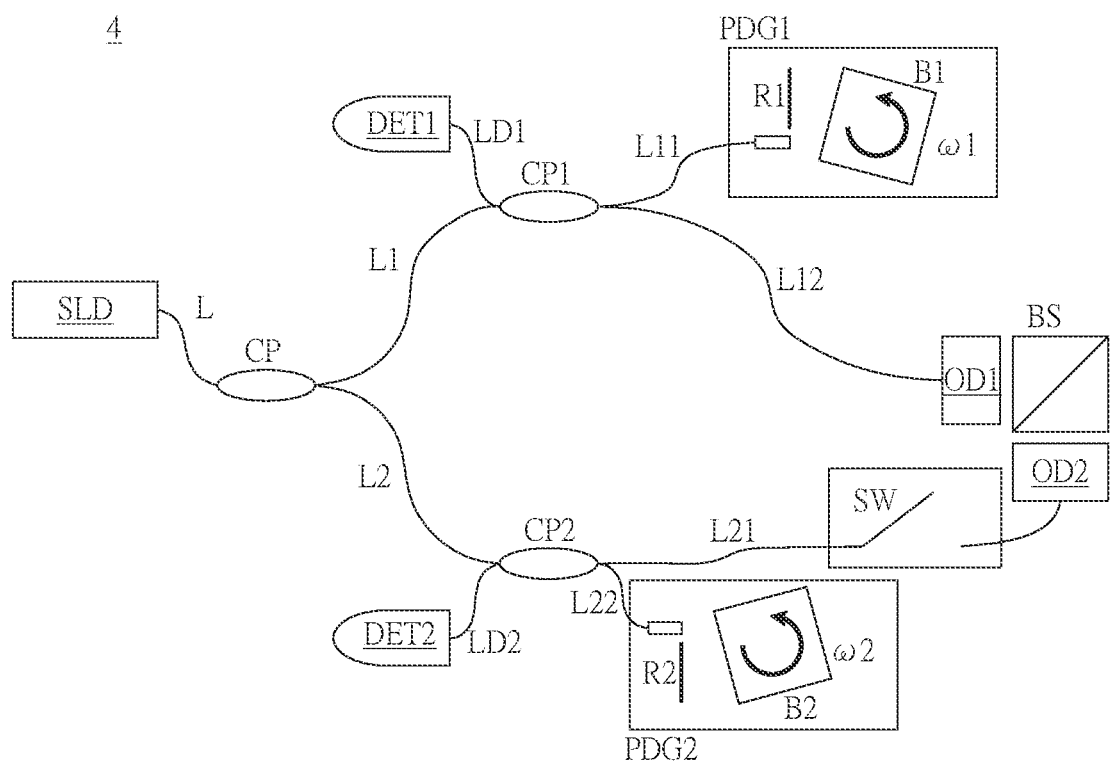
FIG. 4 illustrates a schematic diagram of an optical biometer in still another preferred embodiment of the invention.

Please refer to FIG. 4. FIG. 4 illustrates a schematic diagram of an optical biometer according to another preferred embodiment of the invention. As shown in FIG. 4, firstly, the first rotator B1 and the second rotator B2 rotate at the same initial rotational speed, and each of them finds a signal-receiving angle corresponding to the cornea and the retina respectively.

Then, the rotational speeds of the first rotator B1 and the second rotator B2 are adjusted to the first rotational speed col and the second rotational speed (02 respectively, so that the corneal signal and retinal signal corresponding to the first rotator B1 and the second rotator B2 are synchronized to achieve the effect of synchronous measurement.

It should be noted that an optical switch SW is provided between the second second-stage coupler CP2 and the second optical component set OD2 to control the turn-on or turn-off of the second optical component set OD2. For example, the second optical component set OD2 can be turned off for the eye EYE with a shorter eye axis to save energy consumption, and the second optical component set OD2 can be turned on for the eye EYE with a longer eye axis to speed up the measurement (time-saving). In this embodiment, the axial length from the outermost layer of the cornea to the outermost layer of the retina is measured at the same time. In fact, it can also be changed to measure the axial length of the inner and outer layers of the lens or the axial length of the cornea. The advantage is that it can minimize the time difference between different interfaces for measuring the eye EYE, so as to avoid errors caused by human eye/machine shaking.

Figure 5:
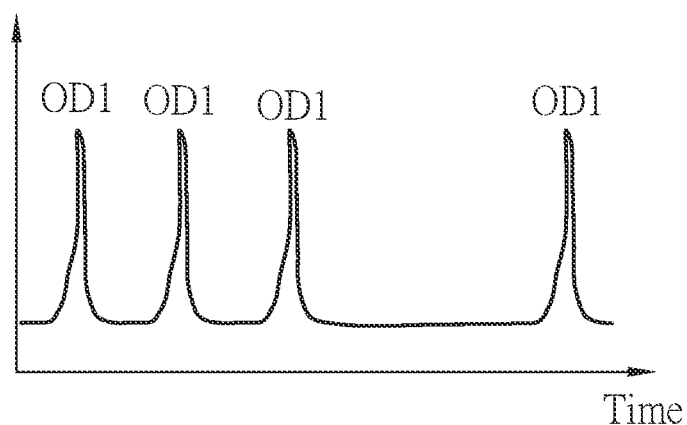
FIG. 5 illustrates a timing diagram of sensing results obtained by a first optical component set scanning four different interfaces of an eye.
Figure 6:
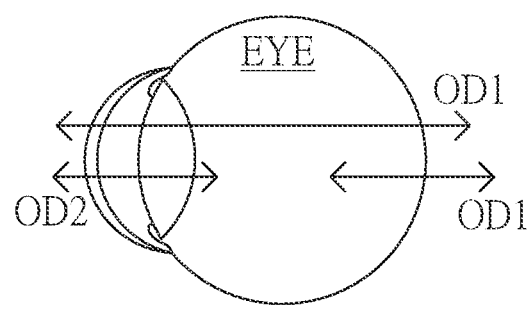
FIG. 6 illustrates a schematic diagram of a first optical component set scanning four different interfaces of the eye and a schematic diagram of a second optical component set scanning first three interfaces of the eye and a first optical component set scanning the last interface of the eye.
Figure 7:
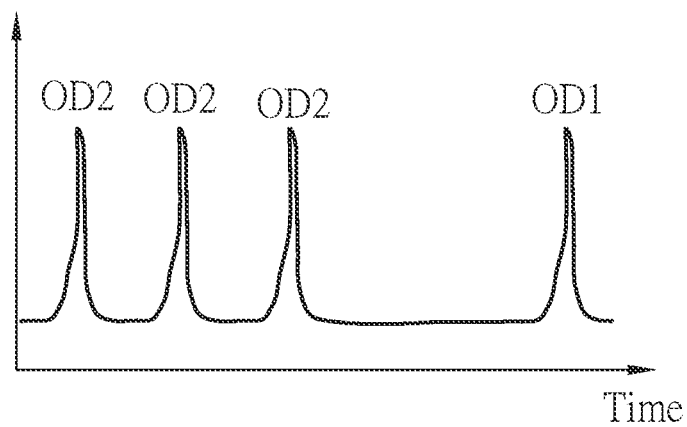
FIG. 7 illustrates a timing diagram of sensing results obtained by the second optical component set scanning first three interfaces of the eye and the first optical component set scanning the last interface of the eye.

Please refer to FIG. 5 to FIG. 7. FIG. 5 illustrates a timing diagram of sensing results obtained by a first optical component set OD1 scanning four different interfaces (such as the cornea, the front of the lens, the back of the lens and the retina) of an eye EYE. FIG. 6 illustrates a schematic diagram of a first optical component set OD1 scanning four different interfaces (such as the cornea, the front of the lens, the back of the lens, and the retina) of the eye EYE and a schematic diagram of a second optical component set OD2 scanning first three interfaces of the eye EYE and a first optical component set OD1 scanning the last interface of the eye EYE. FIG. 7 illustrates a timing diagram of sensing results obtained by the second optical component set OD2 scanning first three interfaces of the eye EYE and the first optical component set OD1 scanning the last interface of the eye EYE.

Please refer to FIG. 8 to FIG. 12. FIG. 8 to FIG. 12 illustrates schematic diagrams of different embodiments of the optical biometer of the invention.

Figure 8:
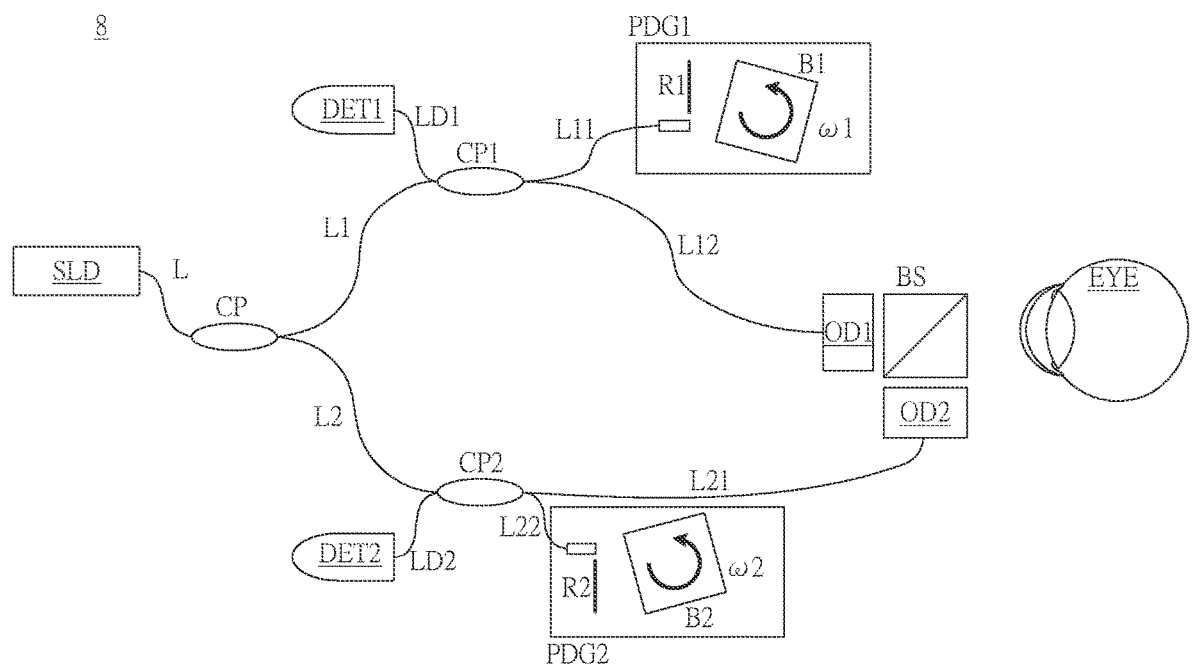
FIG. 8-FIG. 12, FIG. 15 and FIG. 18-FIG. 21 illustrate schematic diagrams of different embodiments of an optical biometer of the invention respectively.

As shown in FIG. 8, the optical biometer 8 includes a light source SLD, a first-stage coupler CP, a first second-stage coupler CP1, a second second-stage coupler CP2, a first optical path difference generator PDG1, a second optical path difference generator PDG2, a first optical component set OD1, a second optical component set OD2, a first detector DET1 and a second detector DET2.

The first optical path difference generator PDG1 of the optical biometer 8 includes a first rotator B1 and a first reflector R1. The first second-stage light L11 emitted by the first second-stage coupler CP1 passes through the first rotator B1 to the first reflector R1, and is then reflected by the first reflector R1 to pass through the first rotator B1 to the first second-stage coupler CP1. The first rotator B1 rotates, so that a first optical path difference is generated in the first second-stage light L11.

Similarly, the second optical path difference generator PDG2 of the optical biometer 8 includes a second rotator B2 and a second reflector R2. The fourth second-stage light L22 emitted by the second second-stage coupler CP2 passes through the second rotator B2 to the second reflector R2 and is then reflected by the second reflector R2 to pass through the second rotator B2 to the second second-stage coupler CP2. The second rotator B2 rotates, so that a second optical path difference is generated in the fourth second-stage light L22.

Figure 9:
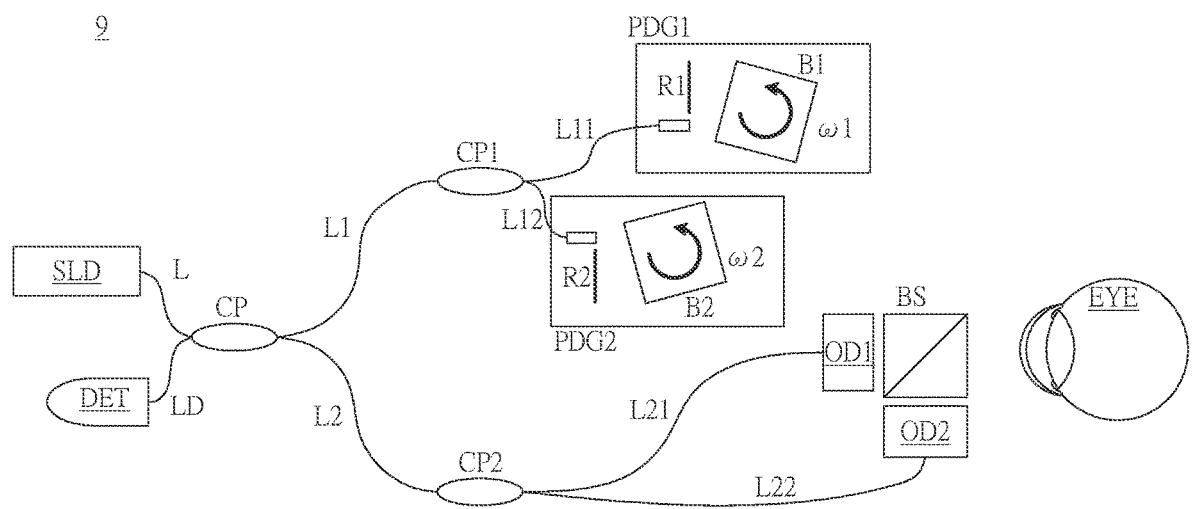

Please refer to FIG. 9. The difference between FIG. 9 and FIG. 8 is that the first second-stage coupler CP1 of the optical biometer 9 is configured to receive the first first-stage light L1 and emit the first second-stage light L11 and the second second-stage light L12 to the first optical path difference generator PDG1 and the second optical path difference generator PDG2 respectively. The second second-stage coupler CP2 is configured to receive the second first-stage light L2 and emit the third second-stage light L21 and the fourth second-stage light L22 to the first optical component set OD1 and the second optical component set OD2 respectively. The detector DET receives the detection light LD transmitted by the first-stage coupler CP. The rest can be deduced by analogy.

It should be noted that the first rotator B1 of the first optical path difference generator PDG1 and the second rotator B2 of the second optical path difference generator PDG2 firstly rotate at the same initial rotational speed and differ by 90 degrees from each other, each uses its own dead zone to avoid interference with the other party's signal and finds out the angle ranges corresponding to the cornea and retina respectively. Next, the rotational speeds of the first rotator B1 of the first optical path difference generator PDG1 and the second rotator B2 of the second optical path difference generator PDG2 are adjusted, so that the signals corresponding to the cornea and the retina appear at the same time, and the effect of synchronous measurement can be achieved.

Figure 10:
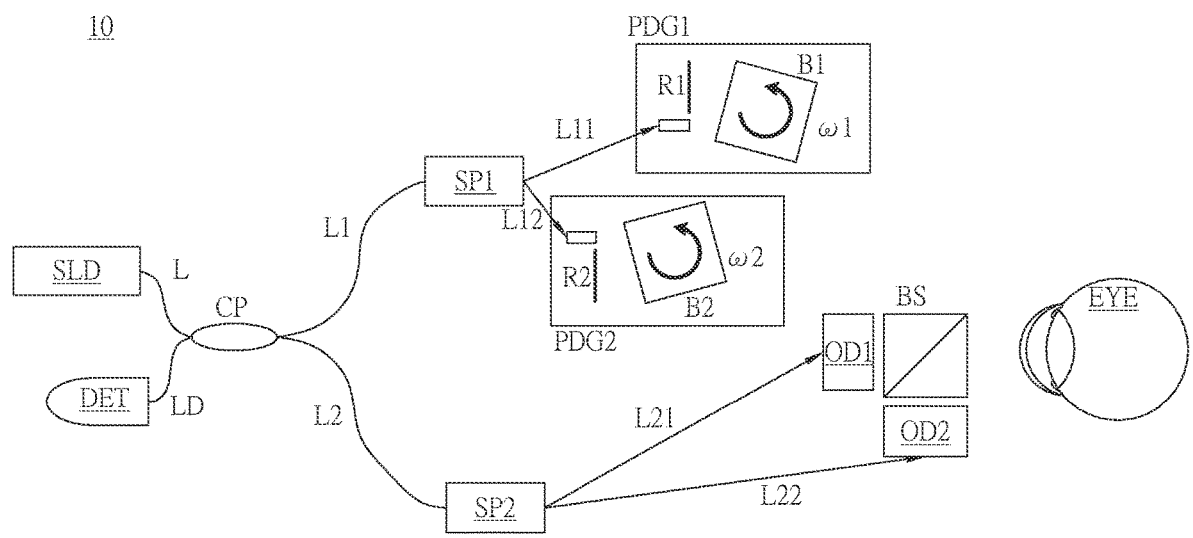

Please refer to FIG. 10. The difference between FIG. 10 and FIG. 9 is that the optical biometer 10 in FIG. 10 uses a first switchable mirror SP1 and a second switchable mirror SP2 to replace the first second-stage coupler CP1 and the second second-stage coupler CP2 of the optical biometer 9 in FIG. 9, so as to achieve energy-saving effect. The rest can be deduced by analogy.

Figure 11:
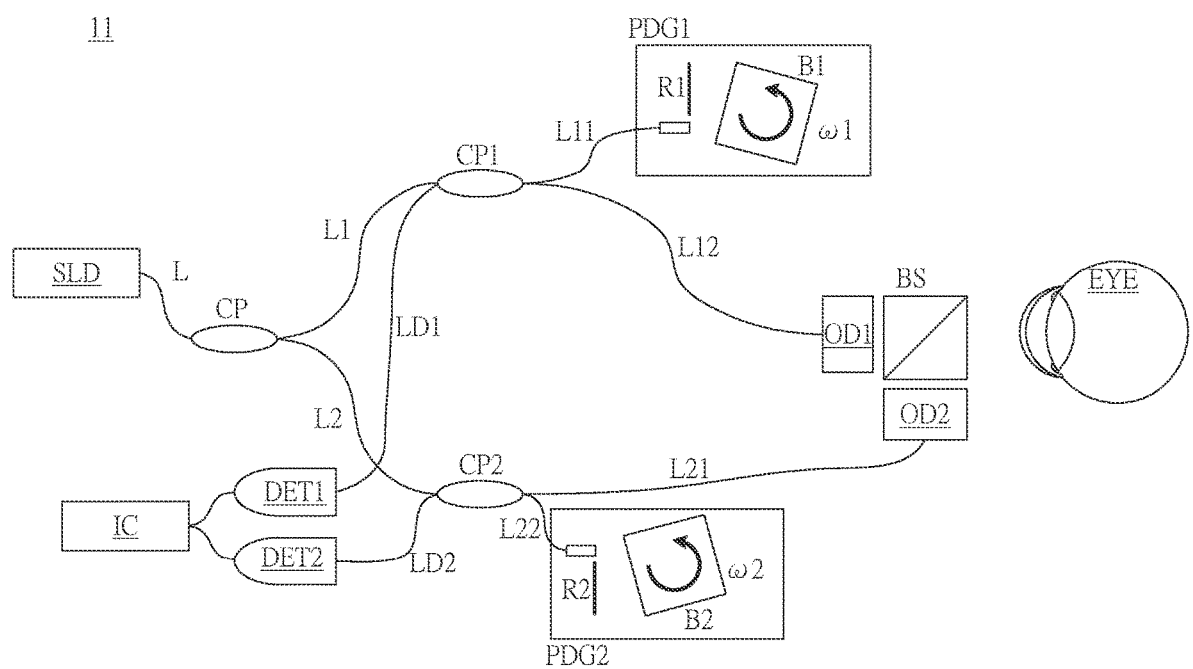

Please refer to FIG. 11. The difference between FIG. 11 and FIG. 8 is that the optical biometer 11 in FIG. 11 also includes a balance detection circuit IC, which is coupled to the first detector DET1 and the second detector DET2 respectively. The first rotator B1 of the first optical path difference generator PDG1 and the second rotator B2 of the second optical path difference generator PDG2 firstly rotate at the same initial rotation speed to find out respective angular areas corresponding to the cornea and the retina. Next, the rotational speeds of the first rotator B1 of the first optical path difference generator PDG1 and the second rotator B2 of the second optical path difference generator PDG2 will be adjusted, the maximum signal corresponding to the cornea and the retina appears at the time with the largest difference, so that the balance detection circuit IC can ensure that one signal subtracts one background to minimize the interference between two balanced detection signals.

Figure 12:
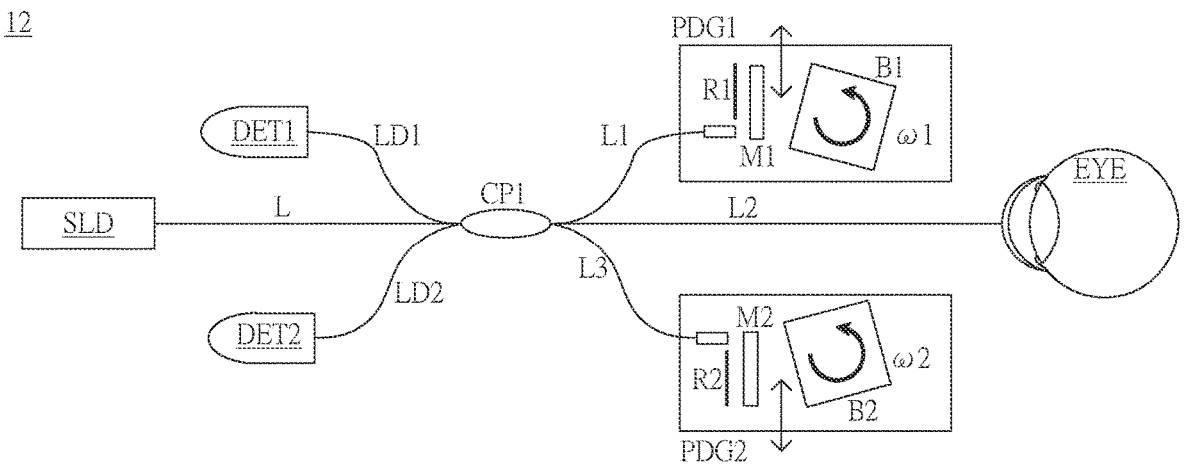

Please refer to FIG. 12. The difference between FIG. 12 and FIG. 8 is that the first-stage coupler CP of the optical biometer 12 in FIG. 12 is configured to receive the incident light L and emit the first first-stage light L1, the second first-stage light L2 and the third first-stage light L3 to the first optical path difference generator PDG1, the eye EYE and the second optical path difference generator PDG2 respectively.

In addition to the first rotator B1 and the first reflector R1, the first optical path difference generator PDG1 also includes a first medium M1 that can be moved in/out. The first medium M1 can selectively move in between the first rotator B1 and the first reflector R1 or move out of the first optical path difference generator PDG1 by moving up and down, so that the first optical path difference is generated in the first first-stage light L1 emitted to the first optical path difference generator PDG1. For example, when measuring the cornea, the first medium M1 is moved in to increase the optical distance to focus the light on the cornea; when measuring the retina, the first medium M1 is removed to reduce the optical distance to focus the light on the retina.

Similarly, in addition to the second rotator B2 and the second reflector R2, the second optical path difference generator PDG2 also includes a second medium M2 that can be moved in/out. The second medium M2 can selectively move between the second rotator B2 and the second reflector R2 or move out of the second optical path difference generator PDG2 by moving up and down, so that the second optical path difference is generated in the third first-stage light L3 emitted to the second optical path difference generator PDG2. For example, when measuring the cornea, the second medium M2 is moved in to increase the optical distance to focus the light on the cornea; when measuring the retina, the second medium M2 is removed to reduce the optical distance to focus the light on the retina.

Figure 13:
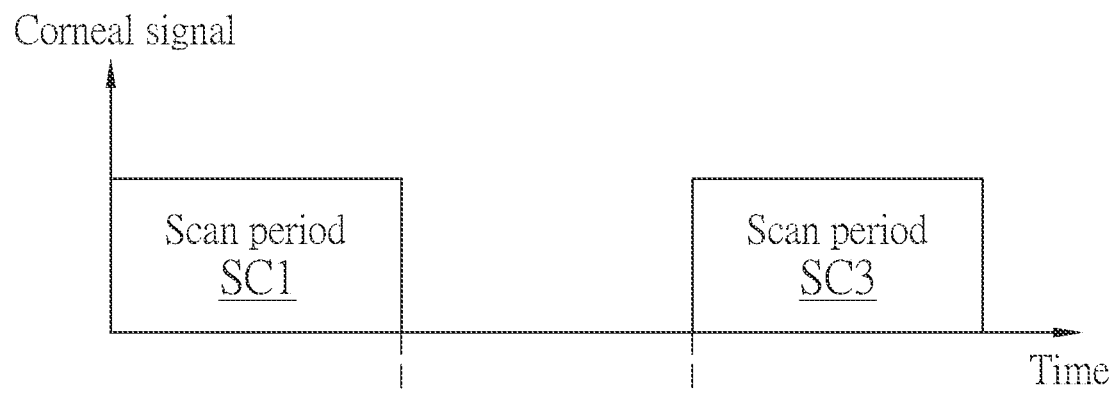
FIG. 13 and FIG. 14 illustrate timing diagrams of scanning periods of a cornea signal and a retina signal of an optical biometer of FIG. 12 respectively.
Figure 14:
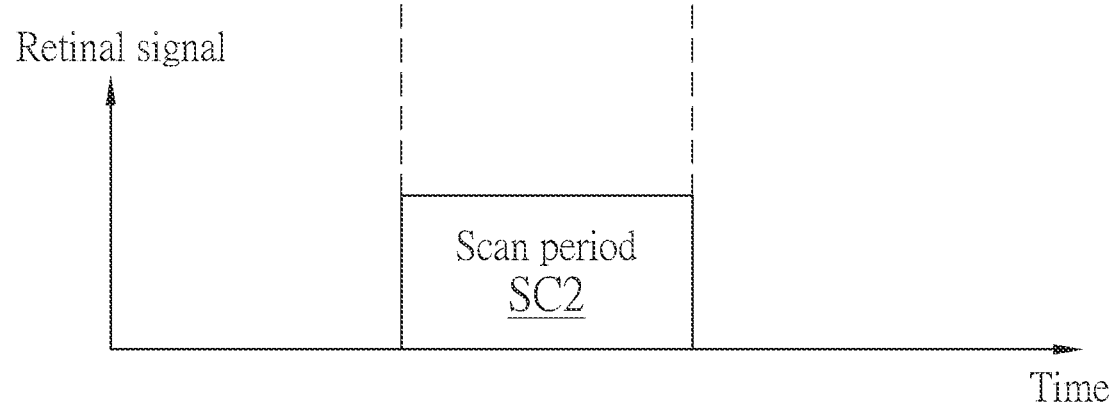

Please refer to FIG. 13 and FIG. 14. FIG. 13 and FIG. 14 illustrate the timing diagrams of the scanning periods of the corneal signal and the retinal signal of the optical biometer 12 in FIG. 12 respectively. As shown in FIG. 13 and FIG. 14, the scanning periods SC1 and SC3 of the corneal signal and the scanning period SC2 of the retinal signal are staggered from each other.

Figure 15:
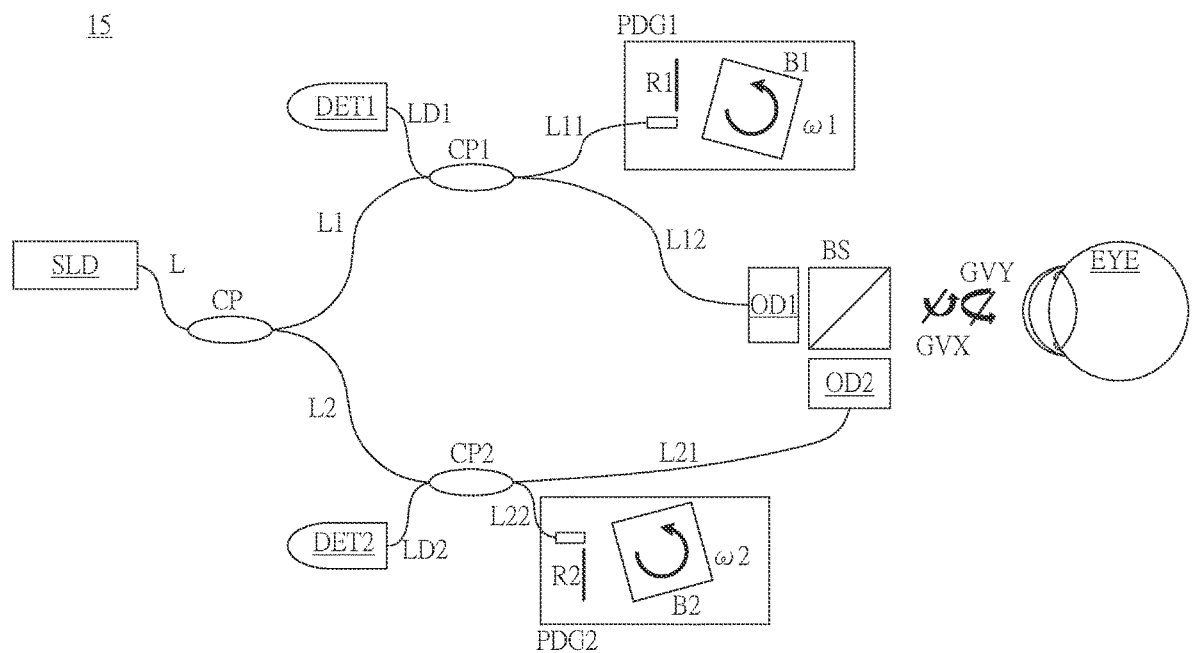

Please refer to FIG. 15. The difference between FIG. 15 and FIG. 8 is that the optical biometer 15 in FIG. 15 also includes galvanometers GVX and GVY, which are disposed between the beam splitter BS and the eye EYE.

Figure 16:
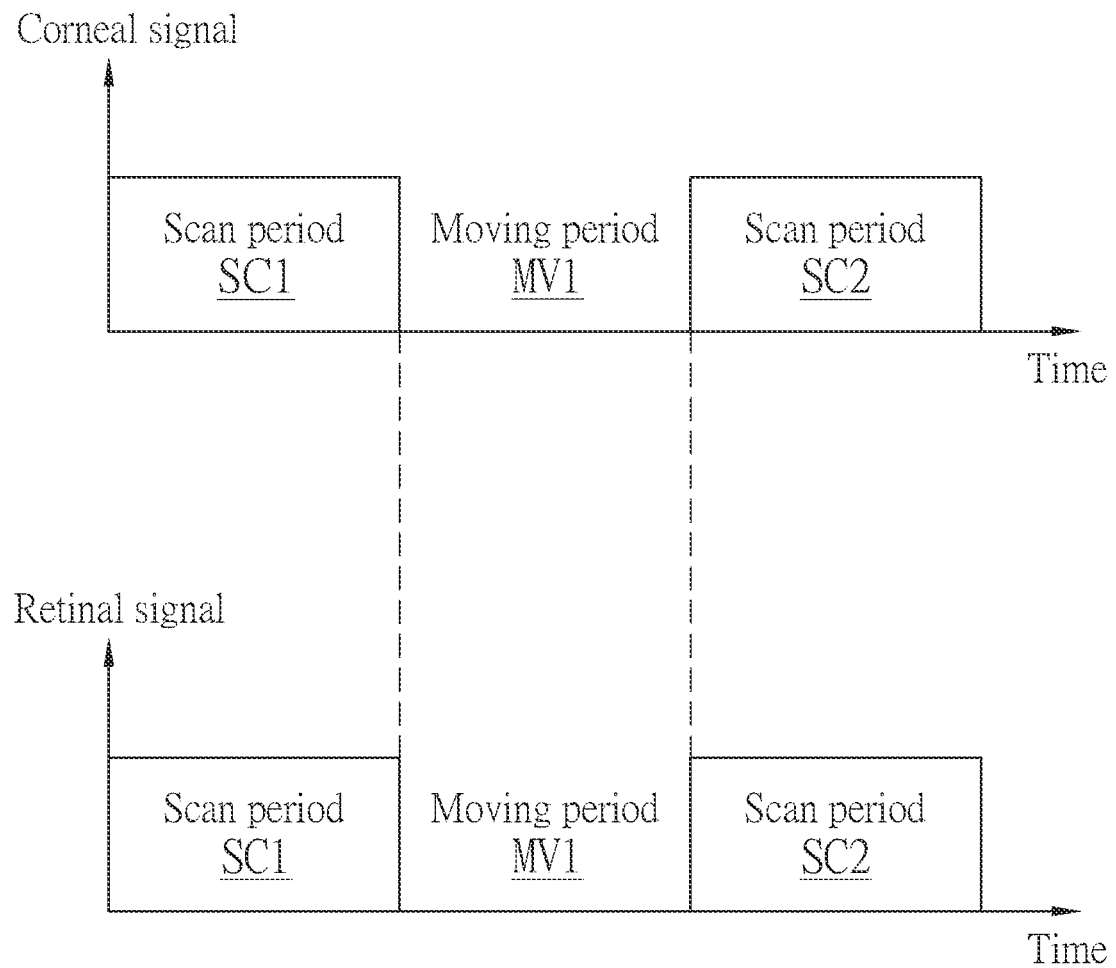
FIG. 16 and FIG. 17 illustrate timing diagrams of different embodiments of a scanning period and a moving period of a corneal signal and a retinal signal of an optical biometer of FIG. 15 respectively.
Figure 17:
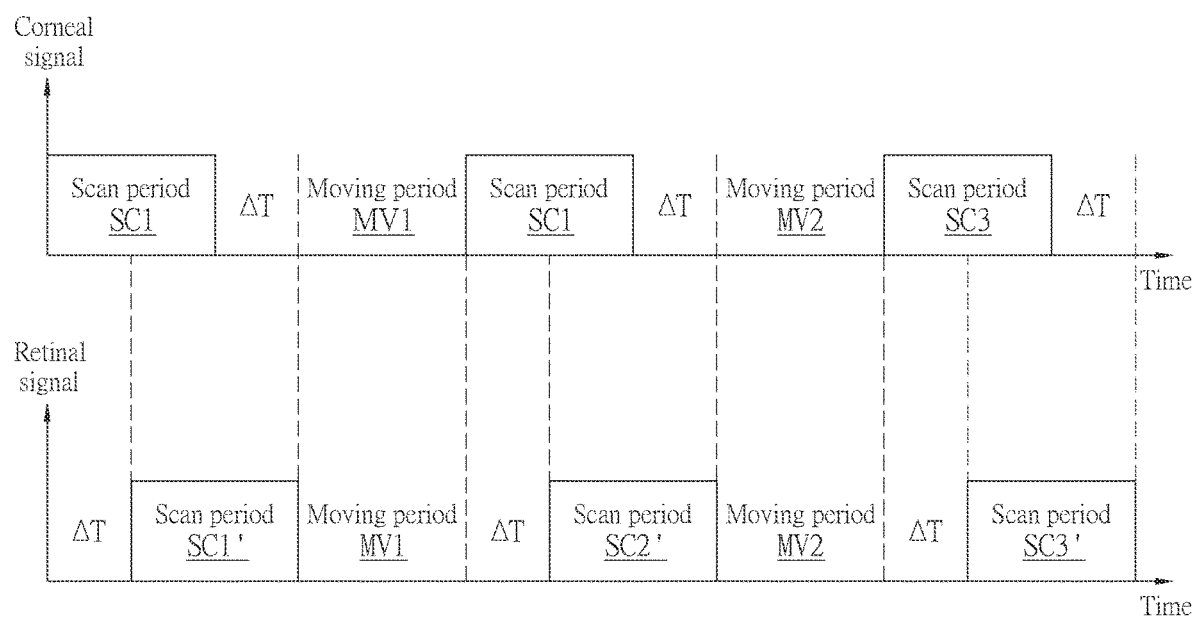

Please refer to FIG. 16 and FIG. 17. FIG. 16 and FIG. 17 illustrate timing diagrams of different embodiments of the scanning period and the moving period of the cornea signal and the retinal signal of the optical biometer 15 in FIG. 15 respectively. As shown in FIG. 16, the scanning periods SC1 and SC2 of the corneal signal and the retinal signal can be synchronized with each other. In addition, during the moving period MV1 that neither the cornea nor the retina is scanned, it can be configured to move the galvanometers GVX and GVY or the motor to scan different positions/interfaces in the eye EYE. As shown in FIG. 17, the scanning periods SC1-SC3 of the corneal signal and the scanning periods SC1'-SC3' of the retinal signal can be partially overlapped by a time interval $\Delta T$, so as to obtain good simultaneously measured signals. In addition, during the moving periods MV1 and MV2 that neither the cornea nor the retina is scanned, they can be configured to move the galvanometers GVX and GVY or the motors to scan different positions/interfaces in the eye EYE.

Figure 18:
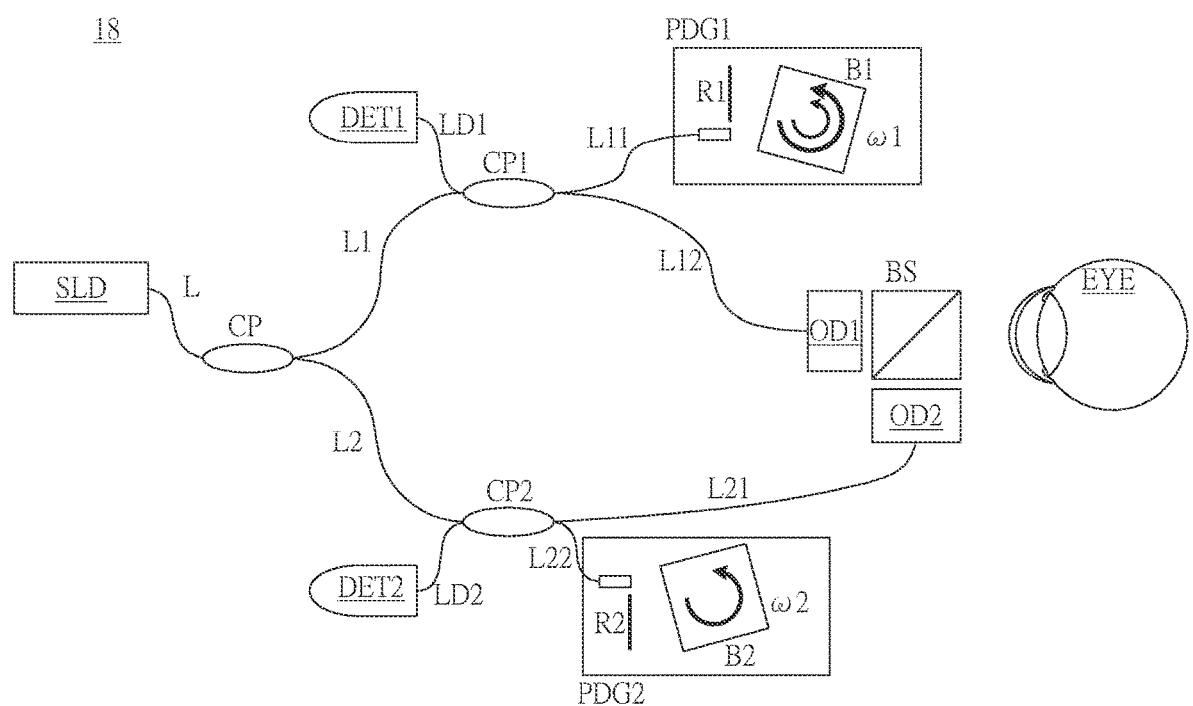

Please refer to FIG. 18. Since the rotational speeds of the first rotator B1 of the first optical path difference generator PDG1 and the second rotator B2 of the second optical path difference generator PDG2 can be different; for example, considering that the retinal signal may be weak, it is necessary to collect more data and average them to obtain a clearer retinal signal. The first rotational speed $\omega 1$ of the first rotator B1 of the first optical path difference generator PDG1 can be set to be twice the second rotation speed ω2 of the second rotator B2 of the second optical path difference generator PDG2, so that the data volume of the retina signal obtained by the first detector DET1 is twice the data volume of the cornea signal obtained by the second detector DET2, so as to obtain clearer retinal signal.

Figures 19, 20:
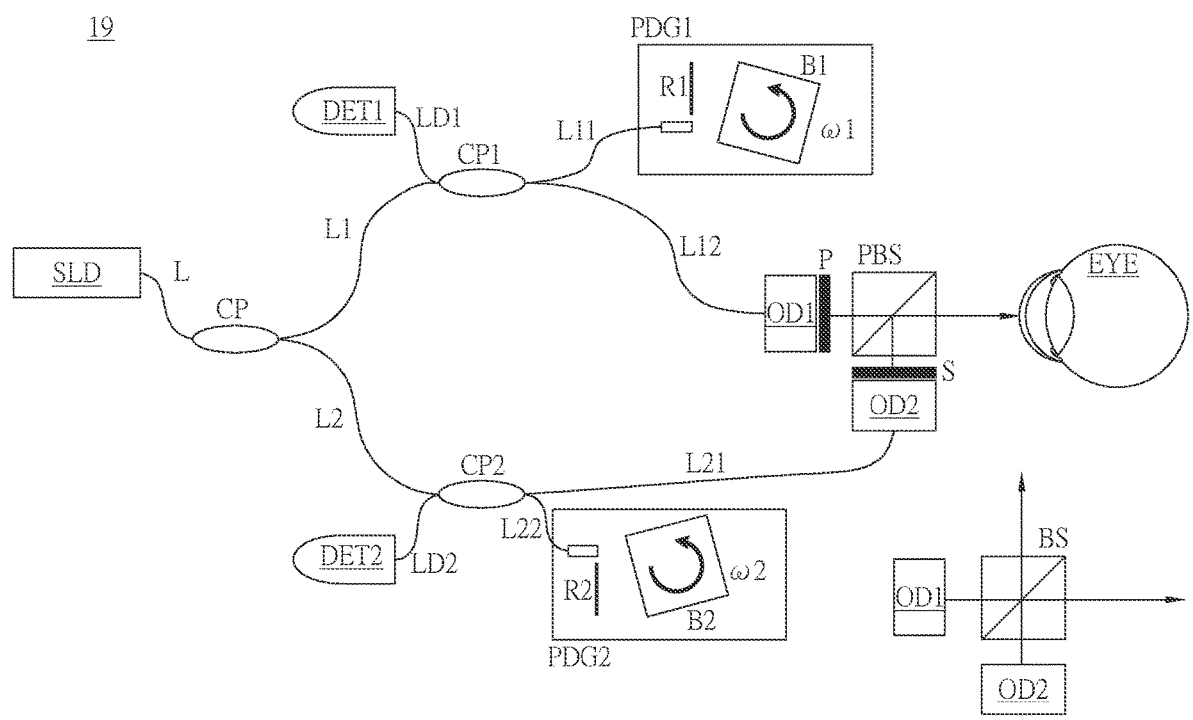

Please refer to FIG. 19. The optical biometer 19 of FIG. 19 also includes a first polarizer (or a wave plate) P and a second polarizer (or a wave plate) S and uses a polarization beam splitter PBS to replace the original beam splitter BS. The first polarizer (or the wave plate) P is disposed between the first optical component set OD1 and the polarization beam splitter PBS. The second polarizer (or the wave plate) S is disposed between the second optical component set OD2 and the polarization beam splitter PBS. The first polarizer (or the wave plate) P and the second polarizer (or the wave plate) S can polarize the second-stage light L12 and the third-stage light L21 respectively and then pass them to the eye EYE through the polarizing beam splitter PBS, so as to effectively reduce optical signal loss. As to FIG. 20, it illustrates a schematic diagram of the optical signal loss caused by the original optical splitter BS.

Figure 21:
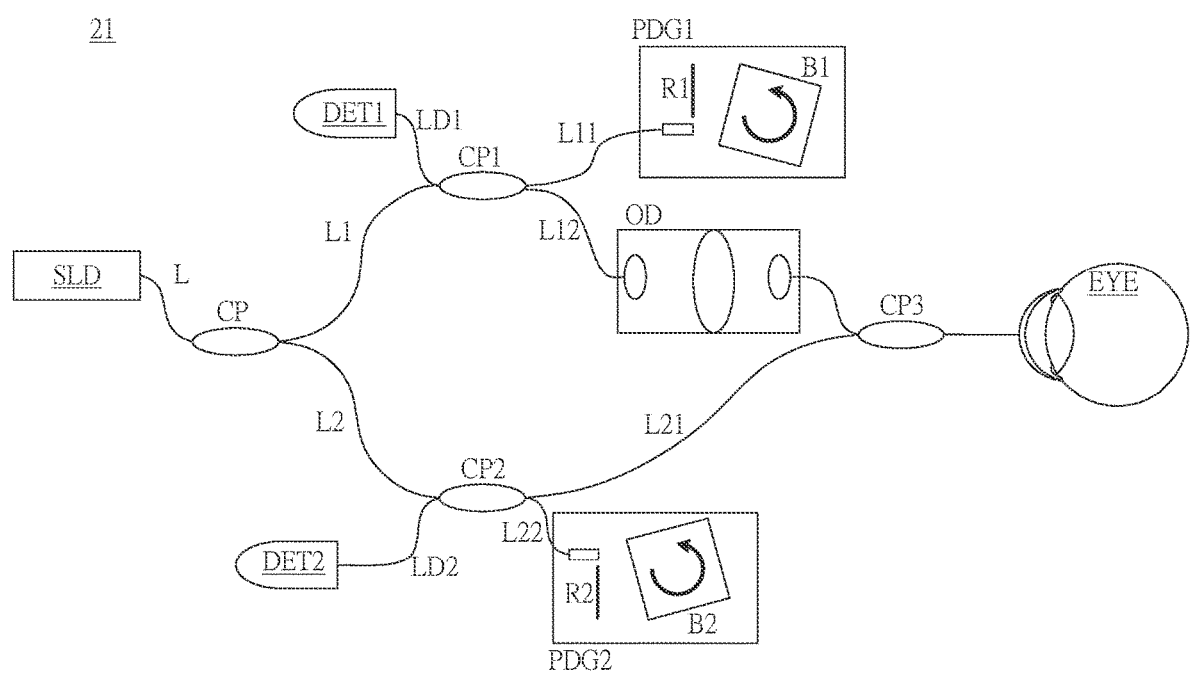

Please refer to FIG. 21. The optical biometer 21 in FIG. 21 uses a 1×2 coupler CP3 to replace the original beam splitter BS, so as to effectively reduce optical signal loss.

Compared to the prior art, the optical biometer proposed by the invention can not only measure different positions/interfaces of the eye synchronously to save time, but also reduce the error caused by human eye/machine shaking, reduce the loss of measurement signals, and move the position to quickly scan the eye axial length/eye shape and the optical coherence tomography (OCT) signal and other functions.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An optical biometer, comprising:
   a light source, configured to emit an incident light;
   a first-stage coupler, configured to receive the incident light and emit a first first-stage light and a second first-stage light respectively;
   a first second-stage coupler, configured to receive the first first-stage light and emit a first second-stage light and a second second-stage light respectively;
   a second second-stage coupler, configured to receive the second first-stage light and emit a third second-stage light and a fourth second-stage light respectively;
   a first optical path difference generator, configured to receive the first second-stage light and emit the first second-stage light with a first optical path difference to the first second-stage coupler;
   a second optical path difference generator, configured to receive the fourth second-stage light and emit the fourth second-stage light with a second optical path difference to the second second-stage coupler;
   a first optical component set, configured to emit the second second-stage light to a first position/interface of an eye and emit a first reflected light reflected from the first position/interface to the first second-stage coupler;
   a second optical component set, configured to emit the third second-stage light to a second position/interface of the eye and emit a second reflected light reflected from the second position/interface to the second second-stage coupler;
   a first detector, configured to receive a first detection signal generated by the first second-stage coupler according to the first second-stage light with the first optical path difference and the first reflected light; and
   a second detector, configured to receive a second detection signal generated by the second second-stage coupler according to the fourth second-stage light with the second optical path difference and the second reflected light.

2. The optical biometer of claim 1, wherein the first position/interface is a retina and the first detection signal is related to the retina.

3. The optical biometer of claim 1, wherein the second position/interface is a cornea and the second detection signal is related to the cornea.

4. The optical biometer of claim 1, wherein the first optical path difference generator comprises a first lens and a first reflector, and the first second-stage light emitted by the first second-stage coupler passes through the first lens to the first reflector and is then reflected by the first reflector to pass through the first lens to the first second-stage coupler, and the first reflector moves horizontally, so that the first optical path difference is generated in the first second-stage light.

5. The optical biometer of claim 4, wherein the second optical path difference generator comprises a second lens and a second reflector, and the fourth second-stage light emitted by the second second-stage coupler passes through the second lens to the second reflector and is then reflected by the second reflector to pass through the second lens to the second second-stage coupler, and the second reflector moves horizontally, so that the second optical path difference is generated in the fourth second-stage light.

6. The optical biometer of claim 1, wherein the first optical path difference generator comprises a first rotator and a first reflector, and the first second-stage light emitted by the first second-stage coupler passes through the first rotator to the first reflector and is then reflected by the first reflector to pass through the first rotator to the first second-stage coupler, and the first rotator rotates, so that the first optical path difference is generated in the first second-stage light.

7. The optical biometer of claim 6, wherein the second optical path difference generator comprises a second rotator and a second reflector, and the fourth second-stage light emitted by the second second-stage coupler passes through the second rotator to the second reflector and is then reflected by the second reflector to pass through the second rotator to the second second-stage coupler, and the second rotator rotates, so that the second optical path difference is generated in the fourth second-stage light.

8. The optical biometer of claim 7, wherein after a first rotation speed of the first rotator and a second rotation speed of the second rotator are adjusted, a signal difference between the first detection signal received by the first detector and the second detection signal received by the second detector is largest, so that a balanced detection of the first detection signal and the second detection signal is realized.

9. The optical biometer of claim 7, wherein after a first rotation speed of the first rotator and a second rotation speed of the second rotator are adjusted, the first rotation speed is larger than the second rotation speed, so that the first detection signal received by the first detector has larger volume than the second detection signal received by the second detector.

10. The optical biometer of claim 7, wherein the first optical path difference generator further comprises a first medium that can be moved in/out, the first medium is selectively moved into between the first rotator and the first reflector or moved out of the first optical path difference generator, so that the first optical path difference is generated in the first first-stage light emitted to the first optical path difference generator; the second optical path difference generator further comprises a second medium that can be moved in/out, the second medium is selectively moved into between the second rotator and the second reflector or moved out of the second optical path difference generator, so that the second optical path difference is generated in the second first-stage light emitted to the second optical path difference generator.

11. The optical biometer of claim 1, further comprising: an optical switch, disposed between the second second-stage coupler and the second optical component set, configured to control the second optical component set to be turned on or off.

12. The optical biometer of claim 1, wherein the optical biometer also comprises a Galvo mirror or a motor, scanning times of the first optical component set and the second optical component set are synchronized or partially overlapped with each other and the Galvo mirror or the motor is moved during a non-scanning time to scan different positions/interfaces of the eye.

13. The optical biometer of claim 1, further comprising:
a polarization beam splitter, disposed among the first optical component set, the second optical component set and the eye;
a first polarizer, disposed between the first optical component set and the polarization beam splitter, configured to polarize the second second-stage light and then transmit the polarized second second-stage light to the eye through the polarization beam splitter; and
a second polarizer, disposed between the second optical component set and the polarization beam splitter, configured to polarize the third second-stage light and then transmit the polarized third second-stage light to the eye through the polarization beam splitter.

* * * * *